E. BROUGH.
Churn.
No. 197,991. Patented Dec. 11, 1877
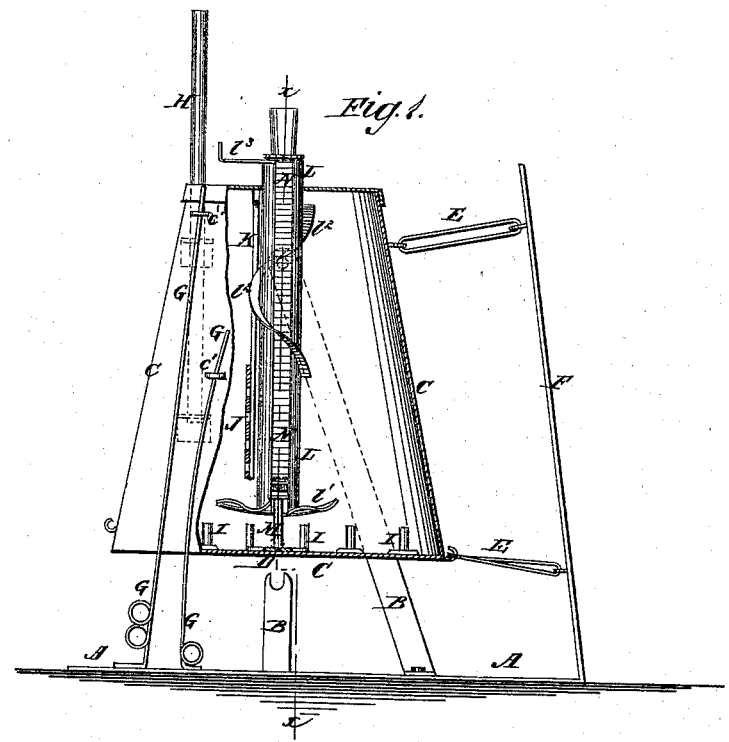
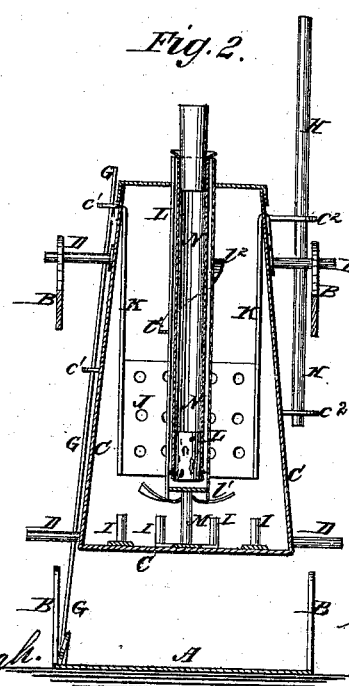
WITNESSES:
Francis McArdle,
J. H. Scarborough.
INVENTOR:
Eliza Brough
BY
ATTORNEYS.

UNITED STATES PATENT OFFICE.

ELIZA BROUGH, OF GREENVILLE, MICHIGAN.

IMPROVEMENT IN CHURNS.

Specification forming part of Letters Patent No. 197,991, dated December 11, 1877; application filed June 25, 1877.

*To all whom it may concern:*

Be it known that I, ELIZA BROUGH, of Greenville, county of Montcalm, and State of Michigan, have invented a new and Improved Churning Apparatus, of which the following is a specification:

Figure 1 is a side view of my improved churn, part being broken away to show the construction. Fig. 2 is a vertical section of the same, taken through the line $x\, x$, Fig. 1.

Similar letters of reference indicate corresponding parts.

The object of this invention is to furnish an improved churning apparatus which shall be so constructed as to enable the churning to be done quickly, and with a comparatively small outlay of labor, and which will enable the milk to be tempered as required without mixing water with it.

The invention will first be described in connection with the drawing, and then pointed out in the claims.

In the drawings, A represents the platform, to which are attached two standards, B, between which the churn-body C is placed, and which have holes formed in their upper ends to receive the gudgeons D attached to the opposite sides of the upper part of said churn-body.

If desired, the standards B may be made short, and with notches in their upper ends to receive the gudgeons D attached to the opposite sides of the lower part of the churn-body C.

Both arrangements are shown in the drawings.

To the upper and lower parts of the churn-body C are attached springs E, made of rubber or other suitable material, and which are also attached to a standard, F, secured to the platform A.

G are spring-rods, the lower ends of which are attached to the platform A, and their upper parts pass through and work in keepers $c^1$ attached to the churn-body C. The churn-body C is oscillated upon its gudgeons D by means of the handle H inserted in keepers $c^2$ attached to the said churn-body C, the springs always bringing it back to an erect position, and thus lessening the labor. As the churn-body C is oscillated the milk is thrown from side to side of said churn-body, so as to bring the butter in a very short time.

The churning is hastened by rigid arms I, attached to the bottom of the churn-body C. The churning may also be hastened by the plate or board J, which is perforated with numerous holes, and is attached to the lower ends of the rods K, which have hooks formed upon their upper ends, to hook into notches in the upper edge of the churn-body C.

When the churning is completed, by oscillating the churn C with a slow motion the board J will act as a gatherer to gather the butter.

L is a tube, open upon one side, and having a socket in its lower end to receive a pivot, M, attached to the center of the bottom of the churn-body C. To the lower end of the tube L is attached a flange, $l^1$, and to its upper part is attached a spiral flange, $l^2$, so that the said tube may also be used as a gatherer to gather the butter.

The tube L has a crank, $l^3$, attached to its upper end, for convenience in rotating it.

N is a tube, made with a closed lower end, and of such a size as to fit loosely into the tube L. The tube N is designed to receive hot or cold water to temper the milk, and is then placed in the tube L, its open upper end being closed with a cork or other convenient stopper.

The machine may also be used for washing clothes, if desired.

Having thus described my invention, I claim as new and desire to secure by Letters Patent—

1. The standard F and springs G combined and connected with a swinging churn, as and for the purpose described.

2. The combination of the open tube L, provided with the loose flange $l^1$, the spiral flange $l^2$, and the crank $l^3$, with the churn-body C, substantially as herein shown and described.

3. The combination of the tube N with the open tube L and the churn-body C, substantially as herein shown and described.

ELIZA BROUGH.

Witnesses:
E. W. TOWER,
A. W. NICHOLS.